3,098,003
ITACONIMIDE FUNGICIDES AND ALGAECIDES

John A. Riddell, Hamden, Conn., assignor to United States Rubber Company, New York, N.Y., a corporation of New Jersey
No Drawing. Filed Oct. 12, 1961, Ser. No. 144,578
20 Claims. (Cl. 167—33)

This invention relates to fungicides and algaecides. It relates particularly to seed protectants and soil fungicides for protecting seeds and seedlings emerging from seeds against attack by fungi, and also to foliage fungicides. It also relates to fabric fungicides. It further relates to fungus resistant paints and anti-fouling marine paints.

I have found that N-(nitrophenyl)itaconimides and N-(nitrotolyl)itaconimides are effective fungicides and algaecides.

Examples of the chemicals that may be used as fungicides and algaecides according to the present invention are N-(mononitrophenyl)itaconimides, e.g. N-(2-nitrophenyl)itaconimide, N-(3-nitrophenyl)itaconimide and N-(4-nitrophenyl)itaconimide, N-(mononitrotolyl)itaconimides, e.g. N-(2-nitro-p-tolyl)itaconimide, N-(3-nitro-p-tolyl)itaconimide, N-(4-nitro-o-tolyl)itaconimide, and N-5-nitro-o-tolyl)itaconimide, and N-(dinitrophenyl)itaconimides, e.g. N-(3,5-dinitrophenyl)itaconimide. Said itaconimides have the general formula:

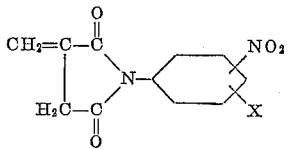

in which X is $NO_2$ or $CH_3$.

The chemical may be applied to seeds by tumbling the chemical with the seeds, either alone or in admixture with a powdered solid carrier, to coat the seeds. Typical powdered solid carriers are the various mineral silicates, e.g. mica, talc, pyrophyllite and clays. The chemical may also be applied to the seeds in admixture with a conventional surface-active wetting agent, with or without additional powdered solid carrier, as by first wetting the mixture with a small amount of water and then tumbling the seeds in the slurry. The surface-active wetting agents that may be used with the chemical may be any of the conventional anionic, non-ionic, or cationic surface-active agents. Such surface-active agents are well known and reference is made to U.S. Patent No. 2,547,724, columns 3 and 4, for detailed examples of the same. As a seed protectant, the amount of the chemical coated on the seeds will be from 1 to 10 ounces per hundred pounds of the seed. As a soil fungicide, the chemical may be applied as a dust in admixture with sand or dirt or a powdered solid carrier such as a mineral silicate, with or without an additional surface-active wetting agent, to the furrows with the planting of the seeds, or the chemical may be applied as an aqueous spray, if desired including a surface-active dispersing agent, or a surface-active dispersing agent and a powderede solid carrier, to the seed rows before, or with, or after planting the seeds. As a soil fungicide, the amount of the chemical applied to the seed rows will be from ½ to 5 pounds per acre applied to the seed rows the equivalent of an area 2″ wide and 2″ deep to parallel rows in one direction a distance of 40″ apart. Also, as a soil fungicide, the chemical may be applied broadcast as a similar dust or aqueous spray with an application rate of 10 to 200 pounds per acre. As a foliage fungicide, the chemical may be applied to growing plants at a rate of ¼ to 10 pounds per acre. Such application is generally as an aqueous spray which also contains a surface-active dispersing agent, or a surface-active dispersing agent and a powdered solid carrier. As a paint fungicide, and as an anti-fouling agent for marine paints, the chemical will generally be added to the paint in an amount from 0.5% to 15% based on the weight of the solids of the paint, which will be substantially the amount present in the dried paint coating. As a fabric fungicide, the chemical will be incorporated in the fabric generally in amount from 0.1% to 10% of the weight of the fabric. As an algaecide, the chemical is applied to the algae by adding the chemical to the water in amount to give the concentration in the water that will kill the desired proportion of the algae existing in the water. The concentration of algaecide will generally be from 0.5 to 50 parts per million (p.p.m.) of the water containing the algae.

The N-(nitrophenyl)itaconimides and N-(nitrotolyl)itaconimides are prepared by reacting the selected nitroaniline or nitroaminotoluene (also called nitrotoluidine) with itaconic anhydride to form the N-(nitrophenyl)itaconamic acid or the N-(nitrotolyl)itaconic acid which is reacted with acetic anhydride and sodium acetate to form the N-(nitrophenyl)itaconimide or the N-(nitrotolyl)itaconimide.

Illustrative preparation of the chemicals of the present invention are described below.

N-(3-nitrophenyl)itaconimide was prepared as follows:

A mixture of 41.4 grams of 3-nitroaniline and 500 ml. of benzene, warmed to about 70° C. to obtain a solution, was stirred into a solution of 33.6 grams of itaconic anhydride in 250 ml. of benzene. A precipitate of N-(3-nitrophenyl)itaconamic acid soon formed and was filtered off, washed with benzene and air dried to yield 63 grams of yellow tinted solid, M.P. 153–156° C. Twenty-five grams of the N-(3-nitrophenyl)itaconamic acid, 4 grams of sodium acetate and 75 grams of acetic anhydride were warmed to about 75° C. with stirring for 15 minutes during which time a brown solution containing some undissolved sodium acetate was formed. The warm mixture was poured in water, producing a nearly white precipitate of N-(3-nitrophenyl)itaconimide. The precipitate was filtered and air dried to yield 24 grams of nearly white solid. Recrystallization from benzene gave 19 grams of white solid, M.P. 160° C.; percent N, found 11.90%; theory 12.06%.

N-(2-nitro-4-tolyl)itaconimide was prepared as follows:

To a solution of 112 grams of itaconic anhydride in 1000 ml. of benzene was slowly added, at room temperature, with stirring, a solution of 152 grams of 3-nitro-4-aminotoluene in 500 ml. of benzene. Stirring was continued for 4 hours, then, after standing over night, the N-(2-nitro-4-tolyl)itaconamic acid, which had separated as a yellow solid, was filtered off, washed with benzene an dair dried to yield 189 grams (69% of theory), M.P. 129–131° C. A sample, after recrystallization from isopropanol melted at 132–133° C.; percent N, found 10.2%, theory 10.6%.

Seventy-nine and two-tenths grams of the above N-(2-nitro-4-tolyl)itaconamic acid, 12.3 grams of anhydrous sodium acetate, 33.6 grams of acetic anhydride and 250 ml. of acetone were heated to reflux, with stirring, for one hour. After cooling, the sodium acetate was filtered off and the filtrate cooled to about −20° C. whereupon 40 grams of the desired product precipitated as pale yellow needles. After recrystallization from a mixture of 250 ml. of benzene and 100 ml. of petroleum ether 26 grams of pure N-(2-nitro-4-tolyl)itaconimide was obtained as pale yellow needles, melting at 111–112° C.; percent N, found 11.3%, theory 11.4%.

The following examples illustrate the invention. All parts and percentages referred to herein are by weight.

Example 1

This example evaluates the chemicals of the present invention as seed protectants and soil fungicides as measured by their disease control of seeds planted in infested soil by the following test:

Two hundred and sixty-four mg. of the chemical were thoroughly mixed in a glass jar with one pound of clean, dry sand. The mixing was accomplished by vigorously shaking the jar which was covered with a screwcap. This masterbatch was then mixed with 6¼ pounds of infested soil to give an 80 p.p.m. (parts per million) concentration of the chemical in the soil-sand mixture. The soil used for the chemical treatment was highly infested with a complex of organisms which cause rotting of seeds, such as Pythium spp., Fusarium spp., and Rhizoctonia spp. The incorporation of the masterbatch containing the chemical into the infested soil took place in a tumbler which was allowed to rotate for five minutes for each mixing operation. This mixing time gave a thorough and even incorporation of the chemical into the infested soil. The treated soil was then placed into five 4″ pots in which five pea seeds per pot are planted about ½″ deep covered with infested, treated soil, i.e. a total of 25 seeds were planted for each chemical soil treatment. An untreated check, replicated five times, in which seeds were planted in the same infested soil but without the chemical treatment was included in the test. Also a check, replicated five times, was included where seeds were planted in sterilized soil without chemical treatment. After the planting was completed, the pots were then transferred to the greenhouse and kept under moist conditions. The results were taken ten to fourteen days later by counting the number of emerged pea seedlings.

The formula for the determination of the per cent disease control is:

$$\text{percent control} = \frac{A-B}{C-B} \times 100$$

where $A$ = percent germination in chemically treated infested soil.
$B$ = percent germination in untreated infested soil.
$C$ = percent germination in untreated sterile soil.

The following table gives the percent disease control of the chemicals of the present invention at a concentration in soil of 80 p.p.m., which is equivalent to an application rate of 2.4 lbs./acre of the chemicals applied to the seed rows the equivalent of an area 2″ wide and 2″ deep to parallel rows in one direction a distance of 40″ apart.

| Chemical: | Disease control (percent) |
|---|---|
| N-(2-nitrophenyl)itaconimide | 63 |
| N-(3-nitrophenyl)itaconimide | 100 |
| N-(4-nitrophenyl)itaconimide | 94 |
| N-(2-nitro-p-tolyl)itaconimide | 100 |

The same test was run on the isomeric N-(3-nitrophenyl)citraconimide and on N-(3-nitrophenyl)maleimide. The results in the table show that these compounds are not effective fungicides, thus differing from the chemicals of the present invention.

| Chemical: | Disease control (percent) |
|---|---|
| N-(3-nitrophenyl)citraconimide | 10 |
| N-(3-nitrophenyl)maleimide | 40 |

Example 2

This example evaluates the chemicals of the present invention by their ability to prevent pre- and post-emergence damping off of plant seedlings.

The infested soil was treated with the various chemicals at 20 p.p.m. as in Example 1. Cotton seed was planted in the treated soils as in Example 1 using 5 seeds per 4″ pot and five pots per treatment. An untreated infested soil check replicated five times, was included in the test. After the planting was completed the pots were then transferred to the greenhouse and watered. Three to four days later the cotton seedlings began to emerge. At the time the seedlings broke through the ground and were in the crook-stage, the results of the emergence were recorded and the test was transferred to a control chamber which had 100% relative humidity and 55° F. temperature for a period of three days. The high humidity and the low temperature produced an active growth of the soil organisms while these conditions were unfavorable for the growth of the cotton. The result was that the cotton seedlings in the untreated infested soil damped off. The test was then returned to the greenhouse.

About five days after the test was returned to the greenhouse, the results were taken by comparing the growth or stand of the cotton in the treated soil with that of the untreated infested soil. The results were recorded as percent emergence before placement in the chamber at 55° F. and percent stand after three days in the chamber at 55° F. and five days in the greenhouse.

The following table gives the percent emergence and percent stand of the treated infested soil as compared to the untreated infested soil check.

| Chemical | Percent Emergence | Percent Stand |
|---|---|---|
| N-(3-nitrophenyl)itaconimide | 72 | 72 |
| N-(4-nitrophenyl)itaconimide | 72 | 52 |
| Untreated infested soil (check) | 32 | 16 |

The same test was run on N-(3-nitrophenyl)-citraconimide and N-(3-nitrophenyl)maleimide with results in the table below again showing that these compounds are not effective fungicides, thus differing from the chemicals of the present invention.

| Chemical | Percent Emergence | Percent Stand |
|---|---|---|
| N-(3-nitrophenyl)citraconimide | 36 | 8 |
| N-(3-nitrophenyl)maleimide | 24 | 16 |

Example 3

This example further illustrates the use of the chemicals of the present invention as seed protectants.

Pea seeds, variety perfection, were treated by tumbling seeds for 30 minutes with various amounts of a composition comprising, by weight, 50% of N-(3-nitrophenyl)itaconimide, 46.5% of kaolin clay, 0.5% of sodium lauryl sulfate, and 3.0% of sodium lignosulfonate (the latter two chemicals being surface-active wetting agents). The rates of application of the N-(3-nitrophenyl)itaconimide were 0.5, 1 and 2 ounces per 100 lbs of seed. The seeds were planted in infested soil as in Example 1 with 5 seeds per 4″ pot and 5 pots per treatment. An untreated infested soil check and an untreated sterile soil check, each replicated five times, were included in the test. The pots were kept in the greenhouse and normally watered. After two weeks the percent germination was obtained by counting the number of the emerged pea seedlings, and the percent disease control was calculated from the percent germinations by the formula shown in Example 1. The disease control for application rates of 0.5, 1 and 2 ounces of the N-(3-nitrophenyl)itaconimide per 100 pounds of seeds was 42%, 50% and 100%, respectively.

Example 4

This example evaluates the chemicals of the present invention as foliage fungicides by their ability to protect plants from subsequent infection by fungus diseases.

One gram of the chemical to be tested was ground with three ml. of acetone and 50 mg. of a non-ionic surface-active agent (a condensation product of an alkyl phenol and ethylene oxide). The acetone and surface-active agent are known to be inactive in the biological tests run.

The mixture was diluted with water, giving suspensions containing 500 and 2000 p.p.m. of the chemical. These suspensions were sprayed on duplicate six inch tomato plants (variety Clark's Early Special) using a gun-type sprayer which delivered 2.5 ml. per second. The plants were then placed in the greenhouse, together with untreated check plants. Twenty-four hours later the treated and untreated check plants were inoculated with a suspension of *Alternaria solani* spores by means of a 20 second spray from an atomizer sprayer (delivery rate 1 ml. per second). The plants were then kept overnight in a control chamber at a temperature of 75° F. and 100% relative humidity. In the morning the plants were transferred to the greenhouse. Three days later the disease was scored by comparing the number of disease lesions of the treated plants with the untreated check.

The formula to determine percent control is:

$$100 - \left(\frac{\text{Ave. no. lesions on treated plant}}{\text{Ave. no. lesions on untreated plant}} \times 100\right) = \text{percent control}$$

The results of the tests are shown in the following table:

| Chemical | Percent Disease Control at p.p.m. | |
|---|---|---|
| | 500 | 2,000 |
| N-(2-nitrophenyl)itaconimide | 97.9 | 99.9 |
| N-(3-nitrophenyl)itaconimide | 100 | 99.8 |
| N-(4-nitrophenyl)itaconimide | 93.4 | 96.5 |
| N-(2-nitro-p-tolyl)itaconimide | 98.1 | 99.5 |

Similar foliage fungicide tests on N-(3-nitrophenyl)-itaconimide at 123 p.p.m. and 250 p.p.m. concentrations gave 96.8% and 98.7% disease control respectively.

A so-called foliage weathering test was run on the N-(3-nitrophenyl)itaconimide and on N-(3-nitrophenyl)citraconimide and N-(3-nitrophenyl)maleimide at the 2000 p.p.m. rate. This test is similar to the above foliage fungicide test except that different times are allowed to elapse between treatment with the chemicals and inoculation with the spore suspension. In this case 1, 2 and 3 days were allowed to elapse. The results are shown in the following table:

| Chemical | Percent Disease Control | | |
|---|---|---|---|
| | Days between Chemical Application and Spore Inoculation | | |
| | 1 | 2 | 3 |
| N-(3-nitrophenyl)itaconimide | 97.5 | 94.4 | 90.1 |
| N-(3-nitrophenyl)citraconimide | 28.4 | 46.4 | 9.8 |
| N-(3-nitrophenyl)maleimide | 71.0 | 35.2 | 38.8 |

These results again show that the N-(3-nitrophenyl)-citraconimide and the N-(3-nitrophenyl)maleimide, unlike N-(3-nitrophenyl)itaconimide, are not effective fungicides, and thus differ from the chemicals of the present invention.

*Example 5*

This example illustrates the effectiveness of the chemicals of the present invention as fabric fungicides.

Strips 1" wide and 6" long of 6 oz. white cotton duck were immersed in a 0.4% solution of N-(3-nitrophenyl)-itaconimide in acetone for five minutes. The strips were removed and dried. The amount of chemical incorporated in the strips was about 1% based on the weight of the fabric. The dried strips and the untreated control strips were buried in infested soil contained in 6" pots to a depth of 3". The soil was infested with organisms such as *Chaetomium globosum*, *Aspergillus* spp., and *Penicillium* spp. The pots were then placed in a chamber at a constant temperature of 86° F. and a 100% relative humidity.

Three weeks after burial, the fabrics were examined to determine their resistance to microbiological deterioration. The untreated control strips broke when pulling from the coil and the fabric was deteriorated and discolored. The strips treated with the N-(3-nitrophenyl) itaconimide did not break when removed from the soil and showed no signs of deterioration or discoloration. A similar test with copper-8-quinolinolate, a commercial fabric fungicide, showed no deterioration of the fabric but the fabric was highly discolored to a greenish brown color.

*Example 6*

This example illustrates the effectiveness of the chemicals of the present invention as paint fungicides.

To samples of an acrylate resin latex paint of 55% solids in aqueous medium containing no mildewcide were added 0.5%, 0.75%, and 1% based on the weight of the paint of N-(3-nitrophenyl)itaconimide, i.e. about 0.9%, 1.4% and 1.8%, respectively, of the chemical based on the weight of the solids of the paint. A control sample of the paint was left untreated. To other samples of the paint were added 0.5% based on the weight of the paint of phenyl mercury acetate and 0.5% of phenyl mercury oleate, which are commercial mildewcides, i.e. about 0.9% of the chemical based on the weight of the solids of the paint. Wooden stakes 25 cm. long, 1.5 cm. wide and 0.25 cm. thick were coated with the various paint samples. The stakes were allowed to dry at room temperature and were then transferred to a chamber where they were exposed to a continuous mist of water at a temperature of 86° F.

Twenty-five days later, the stakes were examined for mildew growth on the paint coatings and the results recorded by rating the severity of the fungus growth. The stakes painted with the untreated control paint showed severe growth of mildew organisms. The stakes covered with the paint coating containing the 0.9%, 1.4% and 1.8% of N-(3-nitrophenyl)itaconimide showed only very slight growth of mildew organisms. The stakes covered with the paint coating containing the phenyl mercury acetate and phenyl mercury oleate showed moderate growth of mildew organisms, which was much greater than on the stakes painted with the paint containing the N-(3-nitrophenyl)itaconimide. The examination showed that the N-(3-nitrophenyl)itaconimide gave much better protection of the paint from mildew attack than the phenyl mercury compounds which are used commercially.

*Example 7*

This example illustrates the effectiveness of the chemicals of the present invention as anti-fouling additives to marine paints.

To a sample of a commercial soya alkyl resin marine paint of 64% solids in a conventional aliphatic hydrocarbon paint medium was added 5% based on the weight of the paint of N-(3-nitrophenyl)itaconimide, i.e. about 8% of the chemical based on the weight of solids of the paint. A control sample of the paint was left untreated.

Panels of marine plywood were cut to 12" x 12" x ¾" and given two coats of spar varnish. One panel was left unpainted. One panel was given two coats of the control paint. One panel was given two coats of the paint containing the N-(3-nitrophenyl)itaconimide. The panels were submerged in sea water at St. Petersburg, Florida, for 13 days, after which they were removed and examined.

There were no barnacles on the flat sides and only a few on the edges of the panel painted with the paint containing the N-(3-nitrophenyl)itaconimide, whereas the unpainted panel and the panel painted with the control paint were heavily coated with barnacles over all surfaces and edges.

Example 8

This example illustrates the effectiveness of the chemicals of the present invention as algaecides.

Aqueous suspensions of N-(3-nitrophenyl)itaconimide and for comparison N-(3-nitrophenyl)citraconimide and N-(3-nitrophenyl)maleimide, to show their relative ineffectiveness as algaecides, were prepared by mixing 20 mg. of the chemical in 2 ml. of ethyl alcohol and diluting with 198 ml. of water. These suspensions were added to algae cultures in water in 250 ml. flasks in which approximately the same number of algae were present to give 20 p.p.m. concentration of the chemicals. The culture used contained the following algae: *Ankistrodemus-falcatus* (blue green algae), *Oscillatoria* spp. (blue green algae), *Chlorella* (green algae), *Lepocinclis* spp. (flagellate), and diatoms.

The effectiveness of the various chemicals was determined 3 and 14 days later by estimating the percent kill by visual observation compared to untreated check flasks. The results are shown in the following table:

| Chemical | Percent Kill After— | |
|---|---|---|
| | 3 Days | 14 Days |
| N-(3-nitrophenyl)itaconimide | 100 | 70 |
| N-(3-nitrophenyl)citraconimide | 0 | 0 |
| N-(3-nitrophenyl)maleimide | 100 | 0 |

The N-(3-nitrophenyl)itaconimide is a very effective algaecide whereas the N-(3-nitrophenyl)citraconimide and N-(3-nitrophenyl)maleimide are relatively ineffective algaecides.

This application is a continuation-in-part of application Serial No. 86,316, filed February 1, 1961, now abandoned.

Having thus described my invention, what I claim and desire to protect by Letters Patent is:

1. The method of protecting seeds and seedlings emerging from seeds against attack by fungi which comprises bringing the seeds into contact with a chemical having the formula $$CH_2=C-C(=O)-N(-C(=O)-CH_2-)C_6H_3(NO_2)(X)$$

in which X is selected from the group consisting of $NO_2$ and $CH_3$.

2. The method of protecting seeds and seedlings emerging from seeds against attack by fungi which comprises coating the seeds with a chemical having the formula $$CH_2=C-C(=O)-N(-C(=O)-CH_2-)C_6H_3(NO_2)(X)$$

in which X is selected from the group consisting of $NO_2$ and $CH_3$.

3. The method of protecting seeds and seedlings emerging from seeds against attack by fungi which comprises applying a chemical having the formula $$CH_2=C-C(=O)-N(-C(=O)-CH_2-)C_6H_3(NO_2)(X)$$

in which X is selected from the group consisting of $NO_2$ and $CH_3$ to soil in the area in which seeds are planted before germination of the seeds.

4. The method of protecting seeds and seedlings emerging from seeds against attack by fungi which comprises applying a chemical having the formula $$CH_2=C-C(=O)-N(-C(=O)-CH_2-)C_6H_3(NO_2)(X)$$

in which X is selected from the group consisting of $NO_2$ and $CH_3$ to soil in the area in which seeds are planted before emergence of seedlings.

5. The method of controlling fungi on plants which comprises applying a chemical having the formula $$CH_2=C-C(=O)-N(-C(=O)-CH_2-)C_6H_3(NO_2)(X)$$

in which X is selected from the group consisting of $NO_2$ and $CH_3$ to the plants at a rate of ¼ to 10 pounds per acre.

6. The method of controlling fungi on growing plants which comprises applying a chemical having the formula $$CH_2=C-C(=O)-N(-C(=O)-CH_2-)C_6H_3(NO_2)(X)$$

in which X is selected from the group consisting of $NO_2$ and $CH_3$ to the growing plants at a rate of ¼ to 10 pounds per acre.

7. The method of protecting seeds and seedlings emerging from seeds against attack by fungi which comprises bringing the seeds into contact with N-(3-nitrophenyl)-itaconimide.

8. The method of protecting seeds and seedlings emerging from seeds against attack by fungi which comprises coating the seeds with N-(3-nitrophenyl)itaconimide.

9. The method of protecting seeds and seedlings emerging from seeds against attack by fungi which comprises applying N-(3-nitrophenyl)itaconimide to soil in the area in which seeds are planted before germination of the seeds.

10. The method of protecting seeds and seedlings emerging from seeds against attack by fungi which comprises applying N-(3-nitrophenyl)itaconimide to soil in the area in which seeds are planted before emergence of seedlings.

11. The method of controlling fungi on plants which comprises applying N-(3-nitrophenyl)itaconimide to the plants at a rate of ¼ to 10 pounds per acre.

12. The method of controlling fungi on growing plants which comprises applying N-(3-nitrophenyl)itaconimide to the growing plants at a rate of ¼ to 10 pounds per acre.

13. The method of preventing microbiological deterioration of fabric which comprises treating fabric with a chemical having the formula $$CH_2=C-C(=O)-N(-C(=O)-CH_2-)C_6H_3(NO_2)(X)$$

in which X is selected from the group consisting of $NO_2$ and $CH_3$.

14. Fabric having incorporated therein 0.1% to 10% of a chemical having the formula

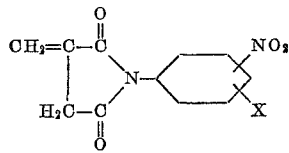

in which X is selected from the group consisting of $NO_2$ and $CH_3$.

15. Fabric having incorporated therein 0.1% to 10% of N-(3-nitrophenyl)itaconimide.

16. The method of protecting paint coatings from deterioration which comprises incorporating therein a chemical having the formula

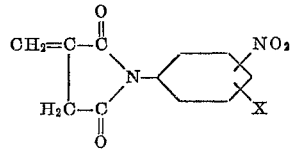

in which X is selected from the group consisting of $NO_2$ and $CH_3$.

17. Paint containing 0.5% to 15% based on the weight of the solids of the paint of a chemical having the formula

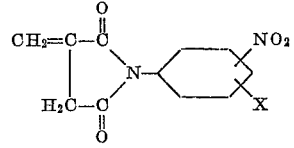

in which X is selected from the group consistingg of $NO_2$ and $CH_3$.

18. Paint containing 0.5% to 15% of N-(3-nitrophenyl)itaconimide based on the weight of solids of the paint.

19. The method of killing algae in water which comprises applying a chemical having the formula

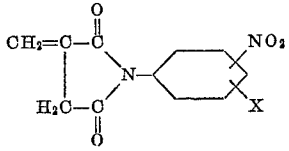

in which X is selected from the group consisting of $NO_2$ and $CH_3$ to said algae.

20. The method of killing algae in water which comprises applying N-(3-nitrophenyl)itaconimide to said algae.

References Cited in the file of this patent
UNITED STATES PATENTS

| | | |
|---|---|---|
| 2,726,981 | Wolf | Dec. 13, 1955 |
| 2,757,119 | Bennet | July 31, 1956 |
| 2,989,436 | O'Brien | June 20, 1961 |
| 3,004,036 | Fan | Oct. 10, 1961 |